(12) United States Patent
Borges et al.

(10) Patent No.: US 11,184,890 B2
(45) Date of Patent: Nov. 23, 2021

(54) LOW-LATENCY WI-FI MAC-LAYER PROTOCOL

(71) Applicant: Apple Inc., Cupertino, CA (US)

(72) Inventors: Daniel R. Borges, San Francisco, CA (US); Oren Shani, Saratoga, CA (US); Christiaan A. Hartman, Mountain View, CA (US); Yong Liu, Campbell, CA (US); Charles F. Dominguez, Redwood City, CA (US); Karthik R. Mekala, Santa Clara, CA (US); Tashbeeb Haque, San Francisco, CA (US); Lawrie Kurian, San Jose, CA (US); Mete Fikirlier, Mountain View, CA (US); Guoqing Li, Campbell, CA (US); Rajneesh Kumar, San Jose, CA (US); Ka Ho P. Poon, San Jose, CA (US); Brian B. Whitaker, Los Gatos, CA (US); Joseph Hakim, Soquel, CA (US); John A. Wilson, San Francisco, CA (US); Tony Chi Wang Ng, Saratoga, CA (US); Roopkumar Parthasarathy Rao, Cupertino, CA (US); Curtis J. Schmidek, Los Altos, CA (US); Shishir Gupta, San Jose, CA (US); Tushar R. Shah, Cupertino, CA (US); Jacob H. Power, Santa Clara, CA (US); Bryan J. Follis, San Mateo, CA (US); Anand Rajagopalan, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 16/532,995

(22) Filed: Aug. 6, 2019

(65) Prior Publication Data
US 2020/0053729 A1 Feb. 13, 2020

Related U.S. Application Data

(60) Provisional application No. 62/716,824, filed on Aug. 9, 2018, provisional application No. 62/812,880, filed on Mar. 1, 2019.

(51) Int. Cl.
*H04W 72/04* (2009.01)
*H04W 72/12* (2009.01)
*H04W 84/12* (2009.01)

(52) U.S. Cl.
CPC ....... *H04W 72/0446* (2013.01); *H04W 72/12* (2013.01); *H04W 84/12* (2013.01)

(58) Field of Classification Search
CPC ............. H04W 72/0446; H04W 72/12; H04W 72/0406; H04W 72/10; H04W 88/08; H04L 47/125; H04L 5/0055
See application file for complete search history.

(56) References Cited

U.S. PATENT DOCUMENTS

| | | | |
|---|---|---|---|
| 2003/0210664 A1* | 11/2003 | Achour | H04W 72/1289 370/329 |
| 2004/0264428 A1* | 12/2004 | Choi | H04W 48/08 370/338 |

(Continued)

*Primary Examiner* — Kibrom T Hailu
(74) *Attorney, Agent, or Firm* — Kowert, Hood, Munyon, Rankin & Goetzel, P.C.

(57) ABSTRACT

An interface circuit in an electronic device may contend for access to a shared communication channel on behalf of the electronic device and a recipient electronic device, where the access has a duration. Then, the electronic device may provide a schedule frame intended for the recipient electronic device that includes information that specifies one or more time slots during the duration that are associated with the recipient electronic device and one or more communication functions of the recipient electronic device in the one or more time slots. Moreover, the electronic device may provide a data frame with data intended for the recipient (Continued)

electronic device. In response, the electronic device may receive a response frame associated with the recipient electronic device, where the response frame is received during at least one of the one or more time slots.

19 Claims, 11 Drawing Sheets

(56) References Cited

U.S. PATENT DOCUMENTS

| | | | | |
|---|---|---|---|---|
| 2011/0274053 A1* | 11/2011 | Baik | ................ | H04W 72/1242 370/329 |
| 2013/0058318 A1* | 3/2013 | Bhatia | ................ | H04W 56/001 370/337 |
| 2016/0029357 A1* | 1/2016 | Lv | ........................ | H04L 5/0055 370/235 |
| 2018/0020480 A1* | 1/2018 | Yang | ................... | H04W 72/042 |
| 2018/0295580 A1* | 10/2018 | Wang | ................ | H04W 72/1284 |

* cited by examiner

LOW-LATENCY WI-FI MAC-LAYER PROTOCOL

CROSS-REFERENCE TO RELATED APPLICATION

This application claims the benefit of U.S. Provisional Application No. 62/812,880, entitled "Low-Latency Wi-Fi MAC-Layer Protocol," by Daniel R. Borges, et al., filed Mar. 1, 2019, and to U.S. Provisional Application No. 62/716,824, entitled "Low-Latency Wi-Fi MAC-Layer Protocol," by Daniel R. Borges, et al., filed Aug. 9, 2018, the contents of both of which are hereby incorporated by reference.

FIELD

The described embodiments relate, generally, to wireless communications among electronic devices, and techniques for performing transactions in which an electronic device contends for a shared communication channel on behalf of the electronic device and at least a recipient electronic device, and then communicates with the recipient electronic device.

BACKGROUND

Many electronic devices communicate with each other using wireless local area networks (WLANs), such as those based on a communication protocol that is compatible with an Institute of Electrical and Electronics Engineers (IEEE) 802.11 standard (which is sometimes referred to as 'Wi-Fi'). However, it can be difficult to ensure reliable, low-latency communication between electronic devices in a WLAN, especially in congested communication environments.

SUMMARY

A first group of embodiments relates to an electronic device that performs a transaction. This electronic device may include a node that can be communicatively coupled to an antenna, and an interface circuit communicatively coupled to the node and that communicates with at least a recipient electronic device during transactions. During operation, for the transaction, the interface circuit contends for access to a shared communication channel on behalf of the electronic device and the recipient electronic device, where the access has a duration, and where the shared communication channel is associated with a wireless local area network (WLAN). Then, the interface circuit provides a schedule frame intended for the recipient electronic device that includes information that specifies one or more time slots during the duration that are associated with the recipient electronic device and one or more communication functions of the recipient electronic device in the one or more time slots. Moreover, the interface circuit provides a data frame with data intended for the recipient electronic device. Next, the interface circuit receives a response frame associated with the recipient electronic device, where the response frame is received during at least one of the one or more time slots.

Note that the communication with the recipient electronic device may be compatible with an IEEE 802.11 communication protocol.

Moreover, when contending for the shared communication channel, the electronic device may use an access priority that is greater than an access priority of one or more recipient electronic devices, including the recipient electronic device.

Furthermore, the duration may have a predefined value and a period between successive transactions may have a second predefined value.

Additionally, when there is insufficient data intended for the recipient electronic device to use all of the one or more time slots, the interface circuit may provide one or more filler frames intended for the recipient electronic device in an unused remainder of the one or more time slots. For example, a given filler frame may include a null frame.

In some embodiments, the one or more communications functions may include transmitting data intended for the electronic device during at least some of the one or more time slots.

Note that a capacity associated with the transaction approximately may equal a product of the duration and a data arrival rate in the electronic device of data intended for the recipient electronic device.

Moreover, the electronic device may include a buffer that stores arriving data associated with the recipient electronic device and a size of the buffer may be approximately greater than or equal to an over-the-air (OTA) latency associated with the communication between the electronic device and the recipient electronic device.

Furthermore, when the transaction involves unicast communication between the electronic device and the recipient electronic device, the response frame may include an acknowledgment.

Additionally, the schedule frame may be intended for a second recipient electronic device and may include information that specifies one or more second time slots during the duration that are associated with the second recipient electronic device and one or more communication functions of the second recipient electronic device in the one or more second time slots. The data frame with the data may be intended for the second recipient electronic device. Moreover, the interface circuit may receive a second response frame associated with the second recipient electronic device, and the second response frame may be received during at least one of the one or more second time slots. For example, the response frame may include a block acknowledgment.

In some embodiments, the duration may be different for different transactions and the transaction may end when available data intended for the recipient electronic device is exhausted.

Moreover, the interface circuit may estimate a period between adjacent transactions based at least in part on arrival rate of data intended for the recipient electronic device, and the schedule frame may include information specifying the estimated period.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for performing a transaction. The method includes at least some of the aforementioned operations performed by the interface circuit in the electronic device.

A second group of embodiments relates to a recipient electronic device that performs a transaction. This electronic device may include a node that can be communicatively coupled to an antenna, and an interface circuit communicatively coupled to the node and that communicates with at least an electronic device during transactions. During operation, for a transaction, the interface circuit receives a schedule frame associated with the electronic device that includes information that specifies one or more time slots during a duration of the transaction when the recipient electronic device accesses a shared communication channel and one or more communication functions of the recipient electronic device in the one or more time slots, where the shared communication channel is associated with a WLAN. Then, the interface circuit receives a data frame with data associated with the electronic device. Next, the interface circuit provides a response frame intended for the electronic device, where the response frame is provided during at least one of the one or more time slots.

Note that the communication with the electronic device may be compatible with an IEEE 802.11 communication protocol.

Moreover, the duration may have a predefined value and a period between successive transactions may have a second predefined value.

Furthermore, in at least some of the one or more time slots, the interface circuit may receive one or more filler frames associated with the electronic device. For example, a given filler frame may include a null frame.

Additionally, the one or more communications functions may include transmitting data intended for the electronic device during at least some of the one or more time slots. Note that, when there is insufficient data intended for the electronic device to use all of the one or more time slots, the interface circuit may provide one or more filler frames intended for the electronic device in an unused remainder of the one or more time slots.

In some embodiments, a capacity associated with the transaction may approximately equal a product of the duration and a data arrival rate of data intended for the recipient electronic device.

Moreover, when the transaction involves unicast communication between the electronic device and the recipient electronic device, the response frame may include an acknowledgment.

Furthermore, the schedule frame may be intended for a second recipient electronic device and may include information that specifies one or more second time slots during the duration that are associated with the second recipient electronic device and one or more communication functions of the second recipient electronic device in the one or more second time slots. The data frame with the data may be intended for the second recipient electronic device. For example, the response frame may include a block acknowledgment.

Additionally, the duration may be different for different transactions.

In some embodiments, the transaction may include communication with multiple recipient electronic devices. Moreover, during the transaction, the interface circuit may transition to a lower-power mode when the recipient electronic device is not communicating with the electronic device.

Furthermore, the schedule frame further may include information specifying an estimated period between adjacent transactions.

Note that, between adjacent transactions, the interface circuit may transition to a lower-power mode.

Other embodiments provide an interface circuit in the recipient electronic device.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Other embodiments provide a method for performing a transaction. The method includes at least some of the aforementioned operations performed by the interface circuit in the recipient electronic device.

A third group of embodiments relates to an electronic device that performs a transaction. This electronic device may include a node that can be communicatively coupled to an antenna, and an interface circuit communicatively coupled to the node and that communicates with at least a recipient electronic device during transactions. During operation, for the transaction, the interface circuit provides a data frame with data intended for the recipient electronic device based at least in part on a schedule with one or more time slots during a duration of the transaction that are associated with the recipient electronic device and one or more communication functions of the recipient electronic device in the one or more time slots. Then, the interface circuit receives a response frame associated with the recipient electronic device, where the response frame is received during at least one of the one or more time slots, and where the providing and the receiving are associated with the shared communication channel in a WLAN. Note that a capacity associated with the transaction approximately equals a product of the duration and a data arrival rate in the electronic device of data intended for the recipient electronic device.

Moreover, the electronic device may include a buffer configured to store arriving data associated with the recipient electronic device and a size of the buffer may be approximately greater than or equal to an OTA latency associated with the communication between the electronic device and the recipient electronic device.

Furthermore, the duration may have a predefined value and a period between successive transactions may have a second predefined value.

Additionally, the duration may be different for different transactions and the transaction may end when available data intended for the recipient electronic device is exhausted.

In some embodiments, the schedule frame may include information specifying an estimated period between adjacent transactions.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for performing a transaction. The method includes at least some of the aforementioned operations performed by the interface circuit in the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
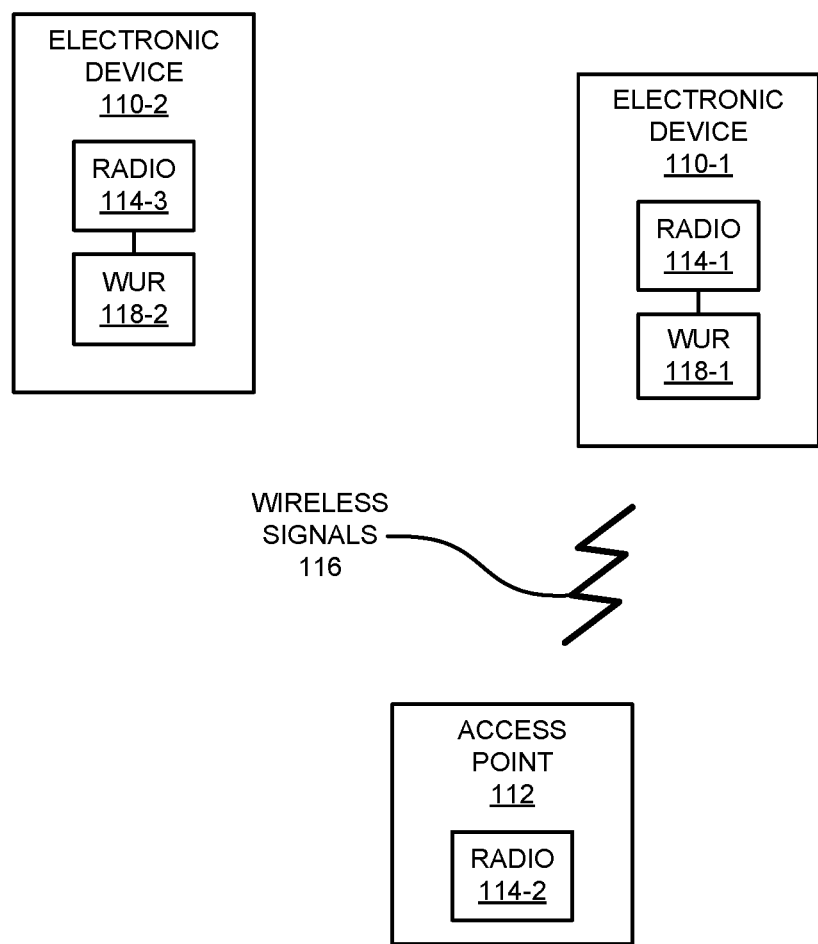
FIG. 1 is a block diagram illustrating an example of electronic devices communicating wirelessly.

An interface circuit in an electronic device may contend for access to a shared communication channel on behalf of the electronic device and a recipient electronic device, where the access has a duration. Then, the electronic device may provide a schedule frame intended for the recipient electronic device that includes information that specifies one or more time slots during the duration that are associated with the recipient electronic device and one or more communication functions of the recipient electronic device in the one or more time slots. Moreover, the electronic device may provide a data frame with data intended for the recipient electronic device. In response, the electronic device may receive a response frame associated with the recipient electronic device, where the response frame is received during at least one of the one or more time slots.

By scheduling time slots on behalf of the electronic device and the recipient electronic device, these communication techniques may facilitate improved communication performance between the electronic device and the recipient electronic device. For example, the communication techniques may reduce collisions when electronic devices contend for a shared communication channel or medium. Consequently, the communication techniques may increase throughput and may reduce latency during communication between the electronic device and the recipient electronic device. Therefore, the communication techniques may improve the user experience when using the electronic device or the recipient electronic device, and therefore may increase customer satisfaction and retention.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11BA and/or IEEE 802.11ax, which are used as illustrative examples in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 11, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-4, radio 114-1 may receive wireless signals 116 that are transmitted by radio 114-2. Alternatively, radio 114-1 may transmit wireless signals 116 that are received by radio 114-2. Note that radio 114-1 may consume additional power in a higher-power mode. If radio 114-1 remains in the higher-power mode even when it is not transmitting or receiving packets, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions radio 114-1 from a lower-power mode to the higher-power mode.

As discussed previously, if radios 114 concurrently contend for a shared communication channel, collisions may occur. This problem may be exacerbated in crowded communication environments. In order to address this challenge, in the disclosed communication techniques, an electronic device (such as access point 112), which is sometimes referred to as a 'low-latency Wi-Fi master' or 'LLW master', may perform transactions with one or more recipient electronic devices (such as one or more electronic devices 110, which are sometimes referred to as 'low-latency Wi-Fi slaves' or 'LLW slaves.' For a transaction, the LLW master may contend for access to a shared communication channel on behalf of the LLW master and one or more LLW slaves, where the access has a duration. Then, the LLW may communicate with the one or more LLW slaves. When contending for the shared communication channel, the LLW master may optionally use an access priority that is greater than an access priority of the one or more LLW slaves.

For example, the LLW master (such as access point 112) may optionally transmit or provide a schedule frame to at least one LLW slave (such as electronic device 110-1) with information that specifies one or more time slots during the duration that are associated with the LLW slave and one or more communication functions of the LLW slave in the one or more time slots. (Note that, in the present discussion, 'provide' is intended to mean 'transmit' when wireless communication occurs or 'convey' when wired communication occurs internal to an electronic device.) Alternatively, the information may be predefined, e.g., it may have been previously provided by the LLW master to the LLW slave when the transactions and the one or more LLW slaves are set up. In these embodiments, the schedule frame may not be transmitted or provided during each or any of the transactions. Notably, the information may be communicated during a set-up frame or may be communicated during a first transaction in a sequence of transactions.

Moreover, the LLW master may transmit or provide to at least the LLW slave a data frame. Furthermore, the LLW slave may transmit or provide to the LLW master a response frame during at least one of the one or more time slots. However, the contents of a transaction may have a different order of these or other operations. Thus, in some embodiments, the LLW master may not send a data frame or an LLW slave may send the data frame first, etc. Note that the communication between the LLW master and the one or more LLW slaves may be compatible with an IEEE 802.11 communication protocol.

In some embodiments, the LLW master may occupy the shared communication channel during the transactions in order to ensure low-latency communication with the one or more LLW slaves. In these embodiments, the duration may have a predefined value and a period between successive transactions has a second (larger) predefined value. Moreover, in order to ensure that the LLW master may be able to occupy the shared communication channel a capacity associated with the given transaction approximately may equal a product of the duration and a data arrival rate in the LLW master of data intended for at least the LLW slave. This may ensure that the LLW master can fill up or use the channel in exactly the amount needed based on how often packets or frames arrive or are received. Furthermore, the receive side in the LLW slave (or the receive side in the LLW master) may include a jitter buffer that stores the arriving data intended for at least the LLW slave and a size of the buffer may be approximately greater than or equal to an OTA latency associated with the communication between the LLW master and at least the LLW slave. Note that the jitter buffer may be used by a receiver (such as radio 114-1) to compensate for jitter in the data reception intervals. Also note that the targeted OTA latency may be from the LLW master to the LLW slave or from the LLW slave to the LLW master. Moreover, there may be more than one targeted OTA latency, such as an OTA latency from the LLW master to the LLW slave of 10 ms and an OTA latency from the LLW slave to the LLW master of 5 ms. In these ways, the communication techniques may ensure that the capacity associated with the given transaction matches the need associated with an incoming data stream, which may allow the LLW master to successfully contend for the shared communication channel during the transactions.

Alternatively, the duration may be different for different transactions and a given transaction may end when available data intended for the LLW slave is exhausted (such as when the buffer is empty). Furthermore, the LLW master may estimate a period between adjacent transactions based at least in part on the arrival rate of data intended for the LLW slave and the schedule frame may include information specifying the estimated period.

In some embodiments, when there is insufficient data intended for the LLW slave to use all of the one or more time slots, the LLW master may transmit or provide to the LLW slave one or more filler frames (such as null frames) in an unused remainder of the one or more time slots. This may ensure that the access to the shared communication channel continues for the entire duration.

Moreover, the one or more communications functions may include the LLW slave transmitting data to the LLW master during at least some of the one or more time slots. In embodiments, the LLW slave may transmit or provide one or more filler frames (such as null frames) to the LLW master in an unused remainder of the one or more time slots when there is insufficient data intended for the electronic device to use all of the one or more time slots. Alternatively, if the LLW master does not receive a transmission from the LLW slave during a time slot, the LLW master may transmit or provide to the LLW slave a filler frame (such as a null frame).

Note that the communication between the LLW master and the one or more LLW slaves may be unicast or multicast communication. When a transaction involves unicast communication between the LLW master and the LLW slave, the response frame may include an acknowledgment. Alternatively, when a transaction involves multicast communication between the LLW master and multiple LLW slaves, the response frame may optional include an acknowledgment to a media access control (MAC) protocol data unit (MPDU) or a block acknowledgment to an aggregated MPDU or AMPDU (e.g., the optional schedule frame may indicate whether acknowledgments are communicated or not). In these embodiments, the schedule frame may be transmitted or provided by the LLW master to at least a second LLW slave and may include information that specifies one or more second time slots during the duration that are associated with the second LLW slave and one or more communication functions of the second LLW slave in the one or more second time slots. Moreover, the data frame with the data may be transmitted or provided by the LLW master to the second LLW slave. In response, the second LLW slave may transmit or provide to the LLW master a second response frame during at least one of the one or more second time slots.

When multiple LLW slaves communicate with the LLW master during a transaction, the LLW slave may transition to a lower-power mode when the LLW slave is not communicating with the LLW master. Moreover, during the one or more time slots, the LLW slave may transition to a higher-power mode, so the LLW slave can either transmit a packet or frame to the LLW master or receive a packet or frame from the LLW master. Furthermore, between adjacent transactions, the LLW slave may transition to the lower-power mode.

In these ways, the communication techniques may allow electronic devices 110 and access point 112 to communicate efficiently (such as with low latency) using radios 114, while significantly reducing collisions associated with use of the shared communications channel. These capabilities may improve the user experience when using electronic devices 110 and access point 112.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, radio 114-2 may provide a trigger frame for the subset of recipient electronic devices. Moreover, in response to receiving the trigger frame, radio 114-1 may provide a group acknowledgment to radio 114-2. For example, radio 114-1 may provide the acknowledgment during an assigned time slot and/or in an assigned channel in the group acknowledgment. However, in some embodiments the one or more of electronic devices 110 may individually provide acknowledgments to radio 114-2. Thus, radio 114-1 (and, more generally, radios 114 in the one or more electronic devices 110) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: a received signal strength indicator (RSSI), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
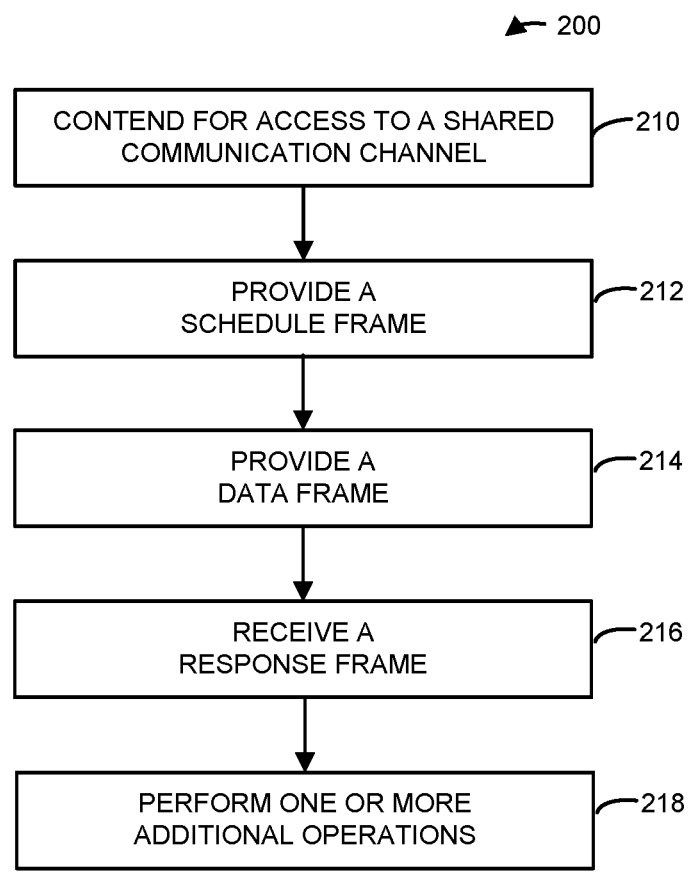
FIG. 2 is a flow diagram illustrating an example of a method for performing a transaction using one of the electronic devices in FIG. 1.

FIG. 2 presents a flow diagram illustrating an example method 200 for performing a transaction. This method may be performed by an electronic device, such as access point 112 or one of electronic devices 110 (such as electronic device 110-1) in FIG. 1. Note that the communication with the recipient electronic device may be compatible with an IEEE 802.11 communication protocol.

During operation, for the transaction, the electronic device may contend for access to a shared communication channel (operation 210) on behalf of the electronic device and a recipient electronic device, where the access has a duration. When contending for the shared communication channel, the electronic device may use an access priority that is greater than an access priority of one or more recipient electronic devices, including the recipient electronic device.

Then, the electronic device may provide a schedule frame (operation 212) intended for the recipient electronic device that includes information that specifies one or more time slots during the duration that are associated with the recipient electronic device and one or more communication functions of the recipient electronic device in the one or more time slots. In some embodiments, the duration may have a predefined value and a period between successive transactions may have a second predefined value. Moreover, the one or more communications functions may include transmitting data intended for the electronic device during at least some of the one or more time slots.

Furthermore, the electronic device may provide a data frame (operation 214) with data intended for the recipient electronic device.

Next, the electronic device may receive a response frame (operation 216) associated with the recipient electronic device, where the response frame is received during at least one of the one or more time slots.

In some embodiments, the electronic device may optionally perform one or more additional operations (operation 218). Notably, when there is insufficient data intended for the recipient electronic device to use all of the one or more time slots, the electronic device may provide one or more filler frames intended for the recipient electronic device in an unused remainder of the one or more time slots. For example, a given filler frame may include a null frame.

Moreover, the electronic device may include a buffer that stores arriving data associated with the recipient electronic device and a size of the buffer may be approximately greater than or equal to an OTA latency associated with the communication between the electronic device and the recipient electronic device.

Note that a capacity associated with the transaction approximately may equal a product of the duration and a data arrival rate in the electronic device of data intended for the recipient electronic device.

Furthermore, when the transaction involves unicast communication between the electronic device and the recipient electronic device, the response frame may include an acknowledgment.

Additionally, the schedule frame may be intended for a second recipient electronic device and may include information that specifies one or more second time slots during the duration that are associated with the second recipient electronic device and one or more communication functions of the second recipient electronic device in the one or more second time slots. The data frame with the data may be intended for the second recipient electronic device. Moreover, the electronic device may receive a second response frame associated with the second recipient electronic device, and the second response frame may be received during at least one of the one or more second time slots. For example, the response frame may include a block acknowledgment.

In some embodiments, the duration may be different for different transactions and the transaction may end when available data intended for the recipient electronic device is exhausted.

Moreover, the electronic device may estimate a period between adjacent transactions based at least in part on arrival rate of data intended for the recipient electronic device, and the schedule frame may include information specifying the estimated period.

Figure 3:
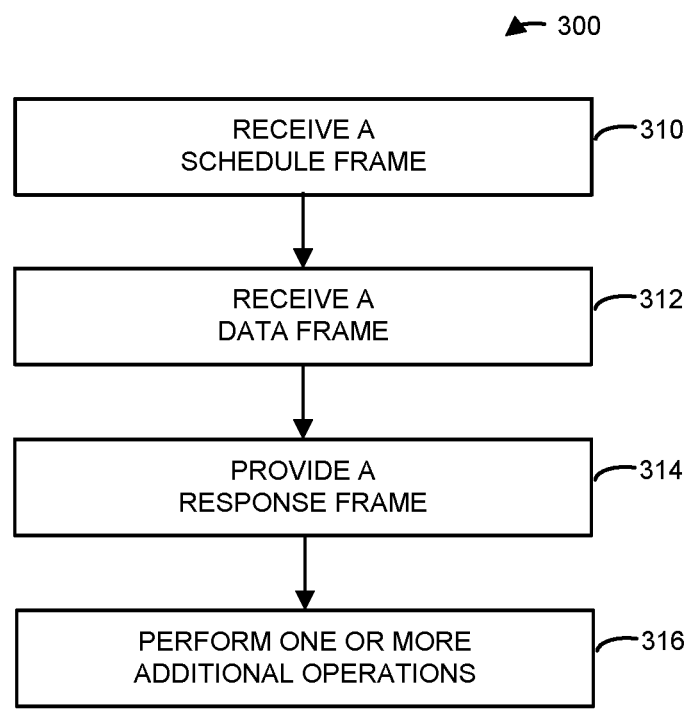
FIG. 3 is a flow diagram illustrating an example of a method for performing a transaction using one of the electronic devices in FIG. 1.

FIG. 3 presents a flow diagram illustrating an example method 300 for providing a transaction. This method may be performed by a recipient electronic device, such as electronic device 110-1 or access point 112 in FIG. 1. Note that the communication with the electronic device may be compatible with an IEEE 802.11 communication protocol.

During operation, for a transaction, the recipient electronic device may receive a schedule frame (operation 310) associated with an electronic device that includes information that specifies one or more time slots during a duration of the transaction when the recipient electronic device accesses a shared communication channel and one or more communication functions of the recipient electronic device in the one or more time slots. Moreover, the duration may have a predefined value and a period between successive transactions may have a second predefined value.

Then, the recipient electronic device may receive a data frame (operation 312) with data associated with the electronic device.

Next, the recipient electronic device may provide a response frame (operation 314) intended for the electronic device, where the response frame is provided during at least one of the one or more time slots.

In some embodiments, the recipient electronic device may optionally perform one or more additional operations (operation 316). Notably, in at least some of the one or more time slots, the recipient electronic device may receive one or more filler frames associated with the electronic device. For example, a given filler frame may include a null frame.

Moreover, the one or more communications functions may include transmitting data intended for the electronic device during at least some of the one or more time slots. Note that, when there is insufficient data intended for the electronic device to use all of the one or more time slots, the recipient electronic device may provide one or more filler frames intended for the electronic device in an unused remainder of the one or more time slots.

In some embodiments, a capacity associated with the transaction may approximately equal a product of the duration and a data arrival rate of data intended for the recipient electronic device.

Moreover, when the transaction involves unicast communication between the electronic device and the recipient electronic device, the response frame may include an acknowledgment.

Furthermore, the schedule frame may be intended for a second recipient electronic device and may include information that specifies one or more second time slots during the duration that are associated with the second recipient electronic device and one or more communication functions of the second recipient electronic device in the one or more second time slots. The data frame with the data may be intended for the second recipient electronic device. For example, the response frame may include a block acknowledgment.

Additionally, the duration may be different for different transactions.

In some embodiments, the transaction may include communication with multiple recipient electronic devices. Moreover, during the transaction, the recipient electronic device may transition to a lower-power mode when the recipient electronic device is not communicating with the electronic device.

Furthermore, the schedule frame further may include information specifying an estimated period between adjacent transactions.

Note that, between adjacent transactions, the recipient electronic device may transition to a lower-power mode.

In some embodiments of methods 200 (FIG. 2) and/or 300, there may be additional or fewer operations. Further, one or more different operations may be included. Moreover, the order of the operations may be changed, and/or two or more operations may be combined into a single operation or performed at least partially in parallel.

In some embodiments, at least some of the operations in methods 200 (FIG. 2) and/or 300 are, at least in part, performed by an interface circuit in the electronic device or the recipient electronic device. For example, at least some of the operations may be performed by firmware executed by an interface circuit, such as firmware associated with a MAC layer, as well as one or more circuits in a physical layer in the interface circuit.

Figure 4:
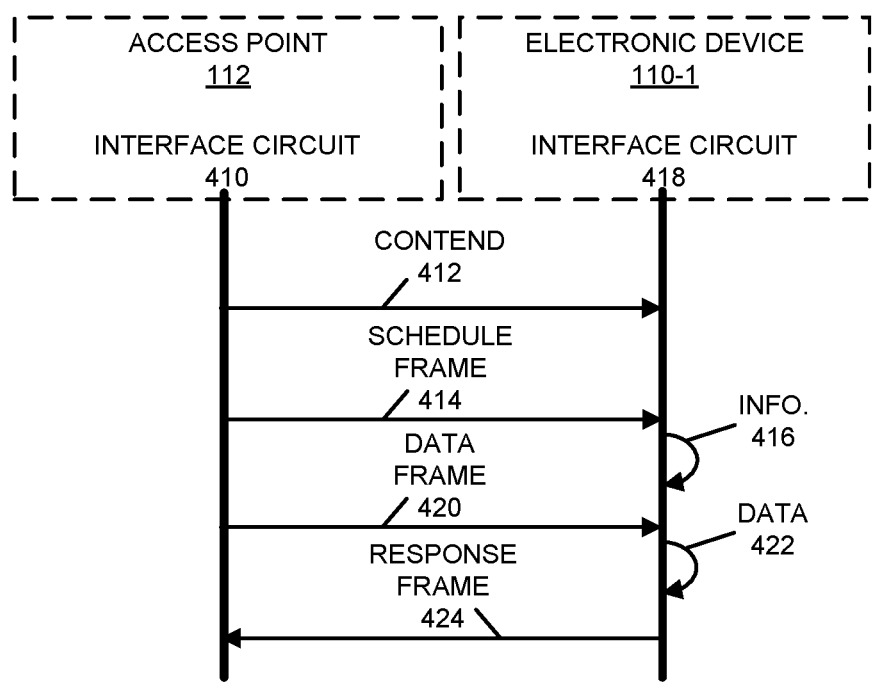
FIG. 4 is a flow diagram illustrating an example of communication between electronic devices, such as the electronic devices of FIG. 1.

The communication techniques are further illustrated in FIG. 4, which presents a flow diagram illustrating an example of communication between electronic device 110-1 (which may be an LLW slave) and access point 112 (which may be an LLW master). For at least a first transaction, interface circuit 410 in access point 112 may contend 412 for access to a shared communication channel on behalf of access point 112 and electronic device 110-1, where the access has a duration. Then, interface circuit 410 may provide a schedule frame 414 to electronic device 110-1 that includes information 416 that specifies one or more time slots during the duration that are associated with electronic device 110-1 and one or more communication functions of electronic device 110-1 in the one or more time slots.

After receiving schedule frame 414 from access point 112, interface circuit 418 in electronic device 110-1 may extract information 416.

Next, interface circuit 410 may provide a data frame 420 with data 422 to electronic device 110-1.

After receiving data frame 420 from access point 112, interface circuit 418 may extract data 422. Then, interface circuit 418 may provide a response frame 424 to access point 112, where the response frame is provided during at least one of the one or more time slots.

Moreover, interface circuit 410 may receive response frame 424 from electronic device 110-1.

While communication between the components in FIG. 4 is illustrated with unilateral or bilateral communication (e.g., lines having a single arrow or dual arrows), in general a given communication operation may be unilateral or bilateral.

The design objectives for low-latency Wi-Fi may optionally include communicating packets or frames reliably with low end-to-end latency using a Wi-Fi-compatible transmitter and/or receiver. Moreover, a small jitter buffer or temporary storage buffer may be used in, e.g., the receive side of a given LLW slave or the receive side in an LLW master, so there may be retransmissions. The packets or frames may be 'guaranteed' to be communicated before the jitter buffer is emptied under or in reasonable channel conditions. Furthermore, the communication techniques may not violate Federal Communications Commission (FCC) or European Telecommunications Standards Institute (ETSI) regulations. Consequently, the communication may be listen-before-talk based. The communication techniques may support: one-to-one, one-to-many and/or many-to-one communication. In the communication techniques, the LLW master may be the electronic device that controls channel access for the LLW slaves and that may optionally transmit the schedule frame.

Moreover, in order to achieve low-latency Wi-Fi, the communication techniques may assume that: the data rates (mbps) are known and configurable; the periodicity of the traffic is known and configurable (e.g., the period and the variance); the expected size of the packets is known and configurable; the number of packets in each period is known and configurable; it is relevant for transmit (Tx) traffic from the LLW master to each of the LLW slaves and for the returning receive (Rx) traffic; and/or the LLW master can use the access point AC_VO (voice) access category or priority (which may be a higher priority than is used by the LLW slaves).

Furthermore, in a back-to-back or continuous mode, the end-to-end latency may be, e.g., approximately 10 ms and the OTA latency may be, e.g., approximately 2 ms. (In the present discussion, 'approximately' may be defined to mean within 1, 5, 10, 25 or 50%) The jitter buffer size may be greater than or equal to the OTA latency. New packets or frames to transmit may arrive at least at the same rate as the OTA latency. In the back-to-back mode, once channel access is gained, the shared communication channel (which is sometimes referred to as a 'channel') may be occupied for the entire duration (such as, e.g., 2 ms), and as soon as it ends the LLW master may immediately try to grab it again as there are new packets or frames to transmit. The object in these embodiments is to not have gaps between transactions in which other electronic devices will have time to grab the shared communication channel. Note that the larger or the longer the gap between transactions, the higher the probability that another electronic device may have traffic to send and will try to grab the shared communication channel.

The idea or approach in the communication techniques may be to try to find a clear shared communication channel to use, because the communication techniques basically may occupy or hog the shared communication channel completely. Note that the communication techniques may usually have low throughput, so the shared communication channel that is occupied may have a narrow bandwidth (such as, e.g., 20 MHz). For example, the communication techniques may use a 2.4 GHz frequency band with eight peer electronic devices. In some embodiments, if the order of transmission during a transaction is known, the electronic devices may try to sleep or transition to a lower-power mode between transmissions.

Alternatively, in a gaps mode, the end-to-end latency may be, e.g., approximately 50 ms and the OTA latency may be, e.g., approximately 10-20 ms. Once again, the jitter buffer size may be greater than or equal to the OTA latency. Other electronic devices on the shared communication channel may start a transmission during the gaps between transactions. In these embodiments, the LLW master may not occupy or hog the shared communication channel. In the gaps mode, new packets or frames to transmit may arrive at the OTA latency or better (such as, e.g., every 10 ms). (Thus, the duration of a transaction may be, e.g., 1 ms, followed by, e.g., a 9 ms gap.) The jitter buffer (e.g., 20 ms) may help mitigate other traffic on the shared communication channel. The LLW master and/or LLW slaves may be power efficient. Consequently, one or more of the LLW master and/or at least one of the LLW slaves may sleep or transition to a lower-power mode during the gaps between transactions.

Figure 5:
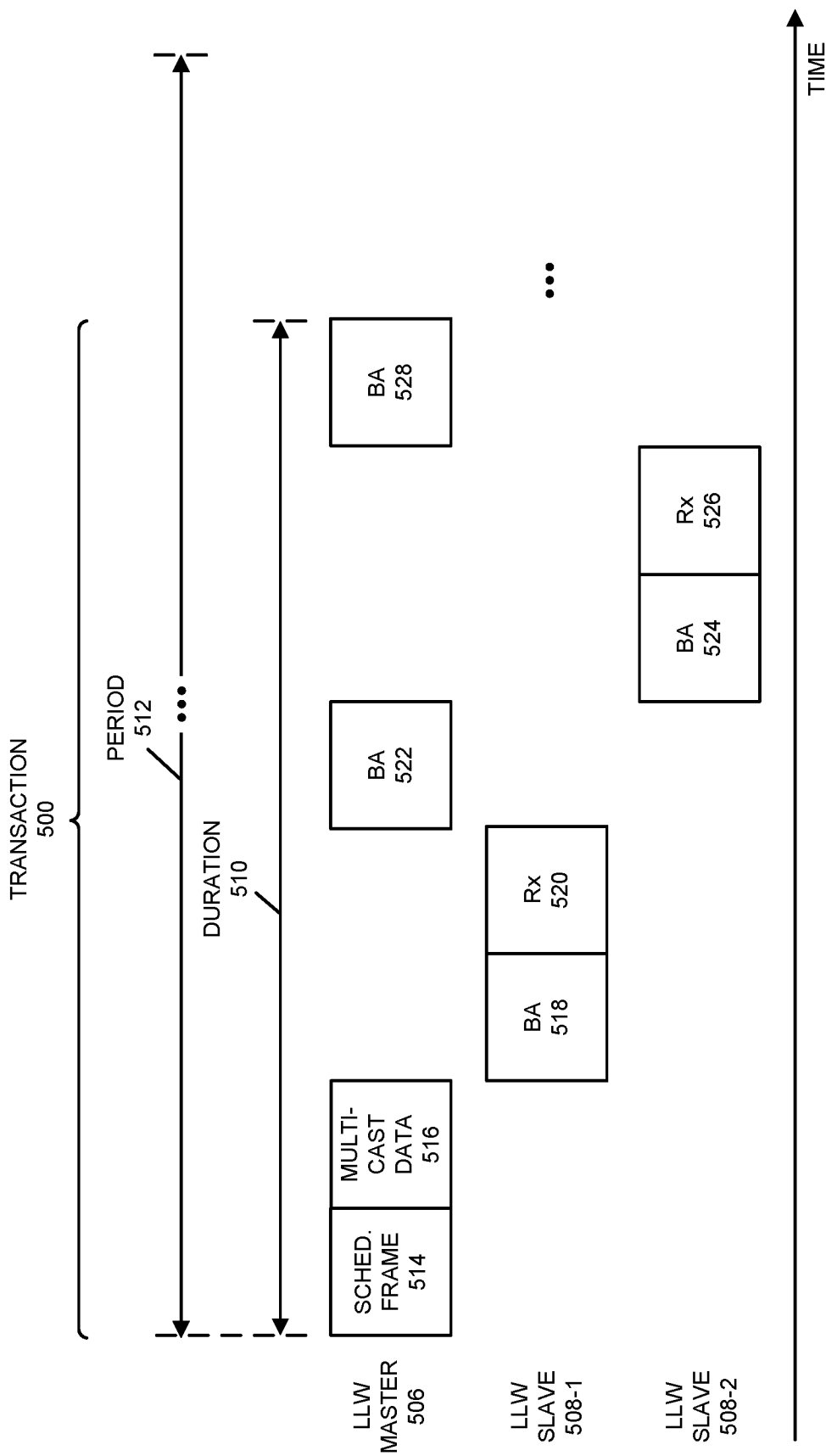
FIGS. 5-10 are drawings illustrating examples of communication during transactions between electronic devices, such as the electronic devices of FIG. 1.

Additionally, the communication techniques may be used to provide a low-latency multicast transaction. This is shown in FIG. 5, which presents a drawing illustrating an example of communication during a transaction 500. For a transaction (such as transaction 500), an LLW master 506 may contend for the shared communication channel once for some or all the electronic devices in the topology (one-to-many). The transmit data provided by LLW master 506 and the receive data received by LLW master 506 may include a single MPDU or an AMPDU. The network allocation vector (NAV), which is reserved for the duration of a transaction, may be propagated by each of the transmitters in the LLW master and the one or more LLW slaves 508 based at least in part on the optional schedule frame NAV. Note that a single multicast low-latency transaction (such as transaction 500) may be defined to duration 510 (such as, e.g., approximately 920 µs), and a period 512 between successive transactions 500 may have a second (larger) predefined value. A given multicast low-latency transaction (such as transaction 500) may include: an optional schedule frame 514 provided by LLW master 506 for one or more LLW slaves 508, multicast data 516 provided by LLW master 506 for one or more LLW slaves 508, a block acknowledgment (BA) 518 (and, more generally, a response frame) received from LLW slave 508-1, receive data (Rx) 520 received from LLW slave 508-1, a block acknowledgment 522 provided by LLW master 506, a block acknowledgment 524 received from LLW slave 508-2, receive data 526 received from LLW slave 508-2, a block acknowledgment 528 provided by LLW master 506, etc. Note that there may be one or more subsequent time slots used by a given LLW slave in transaction 500, and that zero or more additional LLW slaves may communicate with LLW master 506 during transaction 500 as defined or specified, e.g., in the optional schedule frame 514.

Figure 6:
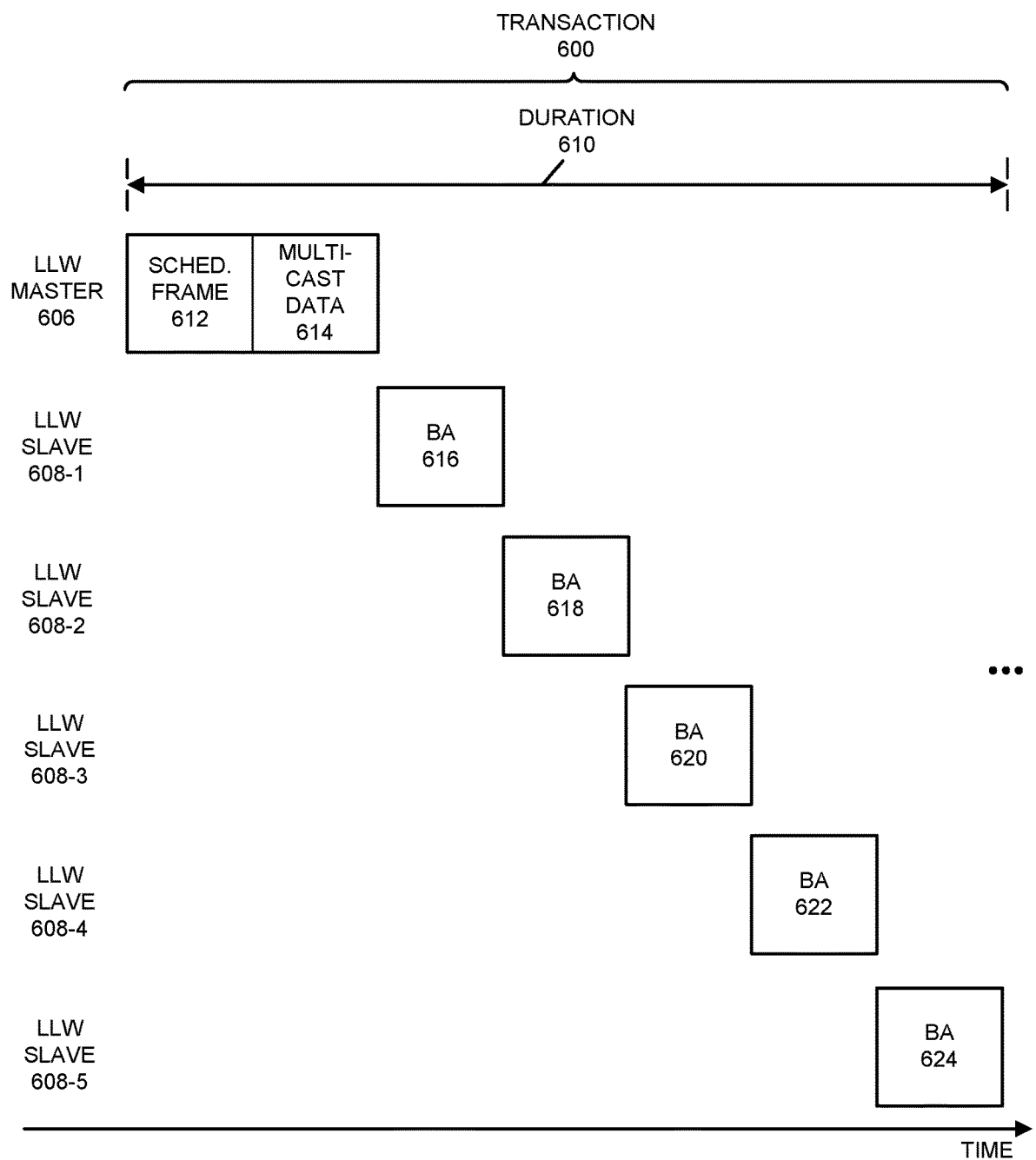

Alternatively, if the LLW slaves do not need to transmit or provide Rx data to the LLW master, then the multicast low-latency transaction may be simplified by removing the uplink traffic. This is shown in FIG. 6, which presents a drawing illustrating an example of communication during a transaction 600. Notably, multicast low-latency transaction 600 may have a duration 610 (such as, e.g., approximately 480 µs). This multicast low-latency transaction may include: an optional schedule frame 612 provided by LLW master 606 for one or more LLW slaves 608, multicast data 614 provided by LLW master 606 for one or more LLW slaves 568, a block acknowledgment 616 received from LLW slave 608-1, a block acknowledgment 618 received from LLW slave 608-2, a block acknowledgment 620 received from LLW slave 608-3, a block acknowledgment 622 received from LLW slave 608-4, a block acknowledgment 624 received from LLW slave 608-5, etc. As described further below, if the multicast transmit data is not needed, a low-latency unicast transaction may be used.

Moreover, the multicast transaction may include a multicast transmit AMPDU. In response, multiple block acknowledgments may be sent during the transaction in the order defined or specified in the optional schedule frame (or that was predefined, e.g., in a set-up frame). The LLW master may examine the received block acknowledgments to determine if a retransmission is needed, which packets or frames need to be retransmitted, and which LLW slaves will be expecting them. Note that in embodiments where the multicast transmission includes a single MPDU, the LLW slaves may reply with acknowledgments instead of block acknowledgments.

Furthermore, in order to facilitate multicast transaction retransmission, the optional schedule frame may include a list of the sequence numbers (SEQNs) of the packets or frames in the transmit data and a list of the LLW slaves in a particular transaction. The LLW master may compare the transmitted SEQNs to the received block acknowledgments to determine if all of the SEQNs were successfully received by the LLW slaves for this transaction. If retransmission is needed, another transaction may be initiated as soon as possible. Note that the retransmission may not contain new SEQNs and may contain a subset of the LLW slaves from the preceding transaction. Moreover, note that the use of SEQNs may allow at least some of the LLW slaves to transition to a lower-power mode when they are not communicating during a transaction.

Figure 7:
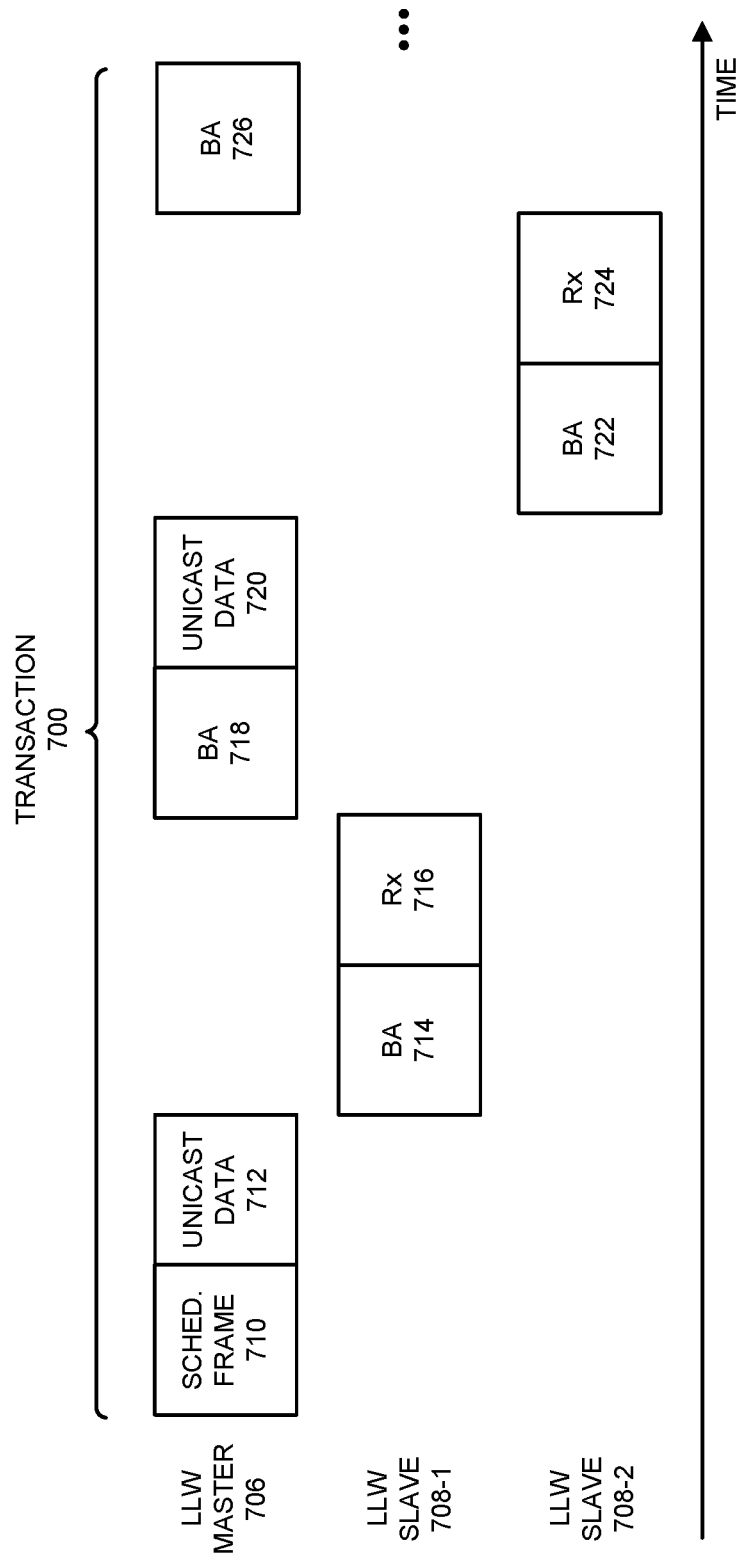

For a low-latency unicast transaction, the LLW master may contend for the shared communication channel once for everyone in the topology (e.g., one-to-many, many-to-one, etc.). Once again, the data transmitted by the LLW master or received by the LLW master in a given transaction may include a single MPDU or an AMPDU. Moreover, the NAV may be propagated by each of the transmitters in the LLW master and at least one LLW slave based at least in part on the optional schedule frame NAV. Note that a single unicast low-latency transaction may be defined to duration (such as, e.g., approximately 2000 µs). This is shown in FIG. 7, which presents a drawing illustrating an example of communication during a transaction 700. This unicast low-latency transaction may include: an optional schedule frame 710 provided by an LLW master 706 for one or more LLW slaves 708, unicast data 712 provided by LLW master 706 for LLW slave 708-1, a block acknowledgment 714 (and, more generally, a response frame) received from LLW slave 708-1, receive data 716 received from LLW slave 708-1, a block acknowledgment 718 provided by LLW master 706, unicast data 720 provided by LLW master 706 for LLW slave 708-2, a block acknowledgment 722 (and, more generally, a response frame) received from LLW slave 708-2, receive data 724 received from LLW slave 708-2, a block acknowledgment 726 provided by LLW master 706, etc. Note that there may be one or more subsequent time slots used by a given LLW slave in transaction 700, and that zero or more additional LLW slaves may communicate with the LLW master during transaction 700 as defined or specified, e.g., in schedule frame 710.

Figure 8:
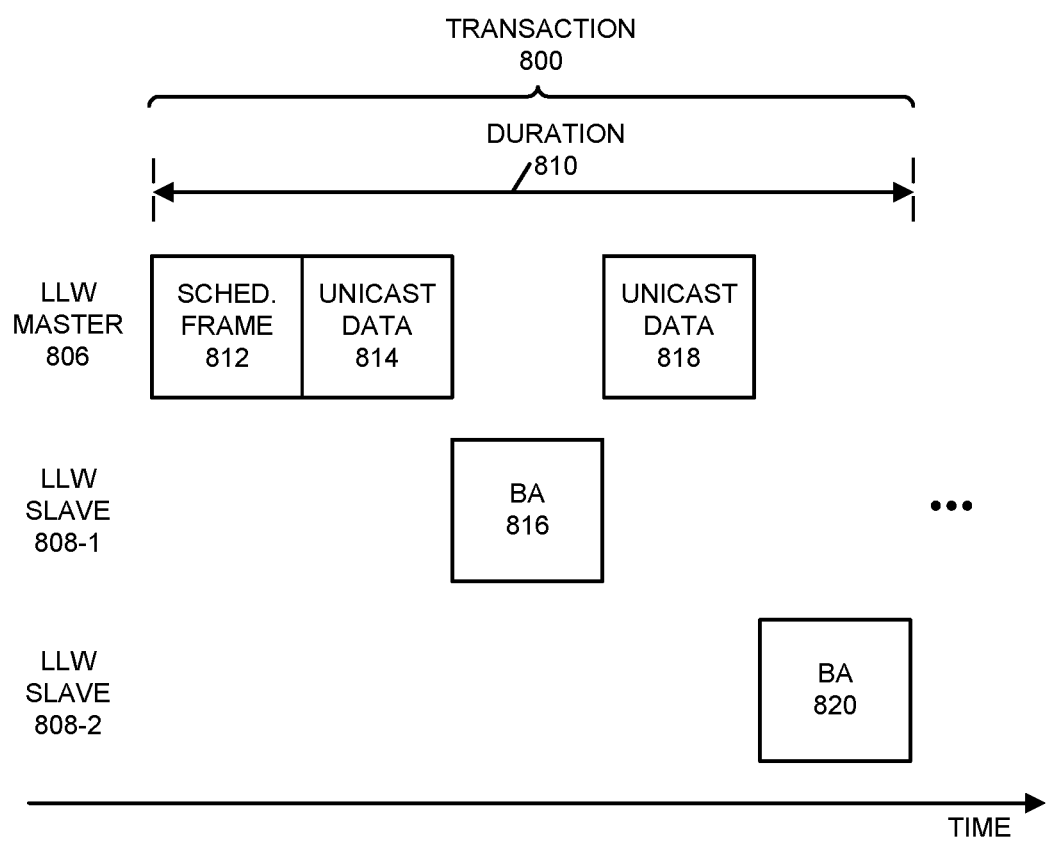
Figure 9:
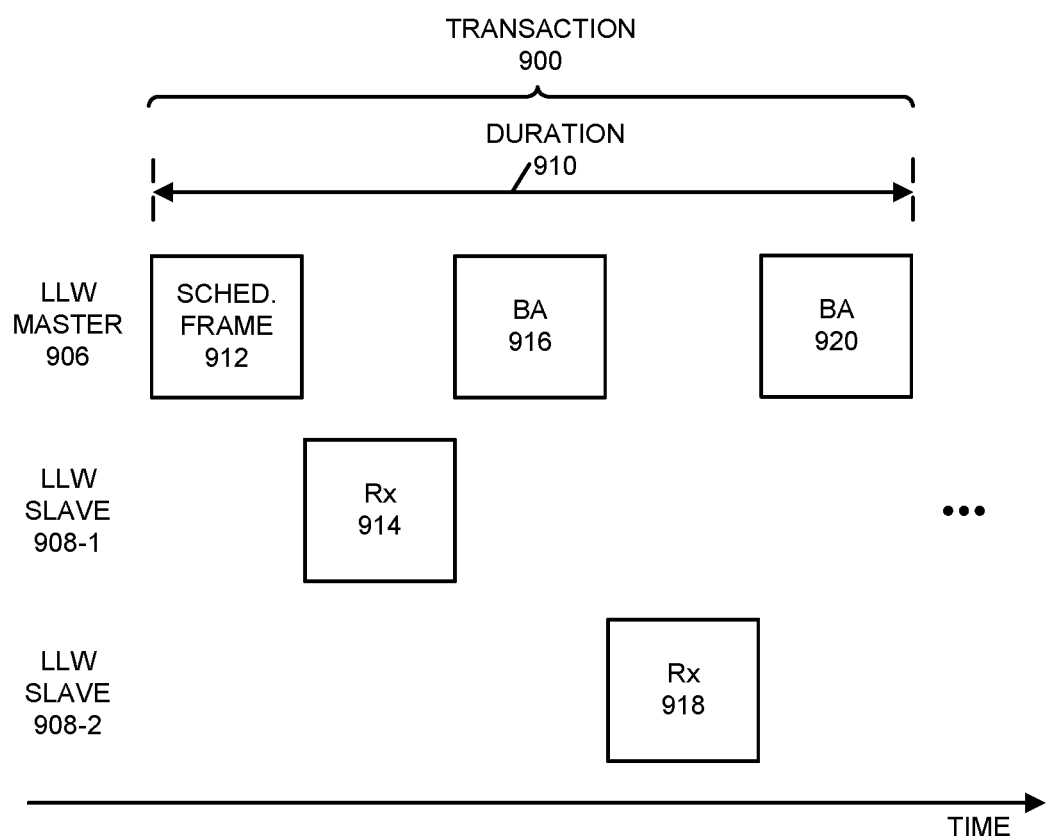

Additionally, if there is no receive data (or if there is only receive data from some of the LLW slaves), then the unicast low-latency transaction may be simplified. This is shown in FIG. 8, which presents a drawing illustrating an example of communication during a transaction 800. Notably, unicast low-latency transaction 800 may have a duration 810 (such as, e.g., approximately 800 µs). This unicast low-latency transaction may include: an optional schedule frame 812 provided by an LLW master 806 for one or more LLW slaves 808, unicast data 814 provided by LLW master 806 for LLW slave 808-1, a block acknowledgment 816 (and, more generally, a response frame) received from LLW slave 808-1, unicast data 818 provided by LLW master 806 for LLW slave 808-2, a block acknowledgment 820 (and, more generally, a response frame) received from LLW slave 808-2, etc. Furthermore, if there is no transmit data (or if there is only transmit data to some of LLW slaves 808), then the unicast low-latency transaction may be simplified. This is shown in FIG. 9, which presents a drawing illustrating an example of communication during a transaction 900. Notably, unicast low-latency transaction 900 may have a duration 910 (such as, e.g., approximately 1000 µs). This unicast low-latency transaction may include: an optional schedule frame 912 provided by an LLW master 906 for one or more LLW slaves 908, receive data 914 provided by LLW slave 908-1 for LLW master 906, a block acknowledgment 916 (and, more generally, a response frame) provided by LLW master 906 to LLW slave 908-1, receive data 918 provided by LLW slave 908-2 for LLW master 906, a block acknowledgment 920 (and, more generally, a response frame) provided by LLW master 906 to LLW slave 908-2, etc.

Moreover, the optional schedule frame may include a list of the SEQNs in the transmit data and an ordered list of the LLW slaves of this transaction. If a unicast retransmission is needed, another transaction may be started as soon as possible. Furthermore, retransmission may not contain any new SEQNs (which were not included in the previous transaction) and may include some or all of the LLW slaves (e.g., a subset of the LLW slaves).

Additionally, the back-to-back mode can use the low-latency multicast transaction and the low-latency unicast transaction formats. Note that the gaps mode can use the low-latency multicast transaction and the low-latency unicast transaction formats. In some embodiments, there may not be dynamic switching between the different combination (so that the communication techniques are glitch-less). However, in other embodiments, dynamic switching may be used.

If retransmission is used in the back-to-back mode, the shared communication channel may be reserved and occupied for a known duration (based on the new packet or frame periodicity). Consequently, filler frames may be added at the end of the time in the transaction (which is sometimes referred to as a 'filler space') as follows. Notably, if the expected period of the traffic is, e.g., 2000 µs, the optional schedule frame may reserve the shared communication channel for the entire 2000 µs. If, e.g., only 800 µs is used, 1200 µs of filler space may be filled with filler frames. Note that, if retransmission is needed, the LLW master may first try to use up the filer space. Moreover, if still more time is needed after using up the filler space, and depending on the jitter buffer, the LLW master may add the packets or frames to the next transaction. Note that every retransmission may be made up of an entire transaction that begins with an optional schedule frame, including the case when the filler space is being used.

Moreover, if retransmission is used in the gaps mode, there may not be a filler space (the transmission may end as soon as possible, e.g., the duration may not be fixed). Instead, as soon as the current transaction ends and the LLW master determine that a retransmission is needed (either for downlink or uplink), another transaction may be initiated immediately, and may need to contend for the shared communication channel again (such as by using enhanced distributed channel access or EDCA). If the LLW master is unable to access the shared communication channel quickly and the planned retransmission transaction may actually end up stepping on the next planned periodic transaction, the LLW master may delay the retransmission until the next planned periodic transaction and may merge them together.

Furthermore, whenever time is allocated in the optional schedule frame for either the LLW master or one of the LLW slaves, that electronic device may fill up its air time with: the data that needs to be sent (or communicated), filler packets or frames (such as a null packet or frame), and/or any other transmission that the LLW slave needs to perform. Note that an electronic device may not exceed its allocated scheduled time. The LLW master may listen to the LLW slaves on their scheduled times. An LLW slave may have missed the optional schedule frame and, therefore, may not transmit during the allocated time (such as during a time slot). In these embodiments, the LLW master may occupy the shared communication channel on behalf of the LLW slave after a time out. In some embodiments, the optional schedule frame may be able to define a 'filler block' to an LLW master or an LLW slave, with a duration, similar to a data block, a block acknowledgment, etc.

Note that low-latency Wi-Fi may prefer, e.g., a 5 GHz channel when possible, even if the infrastructure channel or other activities are using the 5 GHz channel. The implementation may be interface-type agnostic, such that the communication techniques may work with: an AWDL interface, a Neighborhood Area Network (NAN) interface, a station-access point (STA-AP) interface or another type of interface. In embodiments where STA-AP is used, the access point may (most likely) take the LLW master role and the station(s) may (most likely) take the LLW slave role. Note that low-latency Wi-Fi can use, e.g., 20-160 MHz bandwidth.

Additionally, the optional schedule frame may be one or more of a management frame (such as a beacon frame), an action frame or a data frame that is transmitted by the LLW master and is received by the LLW slaves. In embodiments where the schedule frame type/sub-type may be a beacon frame, association identifiers (AIDs) may optionally be used instead of MAC addresses. The schedule frame may include a transmission schedule of the current transaction. The transmissions schedule may indicate when (relative or delta to the time synchronization function from the beginning of the schedule frame) each of the building blocks of the transactions will begin and when the transaction ends. Note that the schedule frame timing may use a 'nominal modulation coding scheme (MCS) rate' to be used in each transmission. If an LLW slave transmission does not fill its allocated block duration, it may add padding (such as filler frames, e.g., null frames). Moreover, when using the filler space for retransmission, the LLW master may provide another optional schedule frame that defines how the remaining time is used. A variety of formats and/or fields may be used in the optional schedule frame.

In order to deal with hidden nodes, the optional schedule frame may also be able to schedule request-to-send (RTS) and clear-to-send (CTS) transmissions by the LLW master and the LLW slaves. In embodiments with very fast turn-around times (such as when the first scheduled block after the optional schedule frame is a receive from an LLW slave), the RTS and CTS can be used to buy time until the LLW slave is ready to transmit the receive frame. Note that the length of duration of the LLW transaction may need to be considered when using RTS and CTS frames, because it may need to be short.

Moreover, the optional schedule frame may include a one or more building blocks, such as: unicast or multicast data, a filler space, RTS and/or CTS frames, a block acknowledgment, an acknowledgment, etc.

Figure 10:
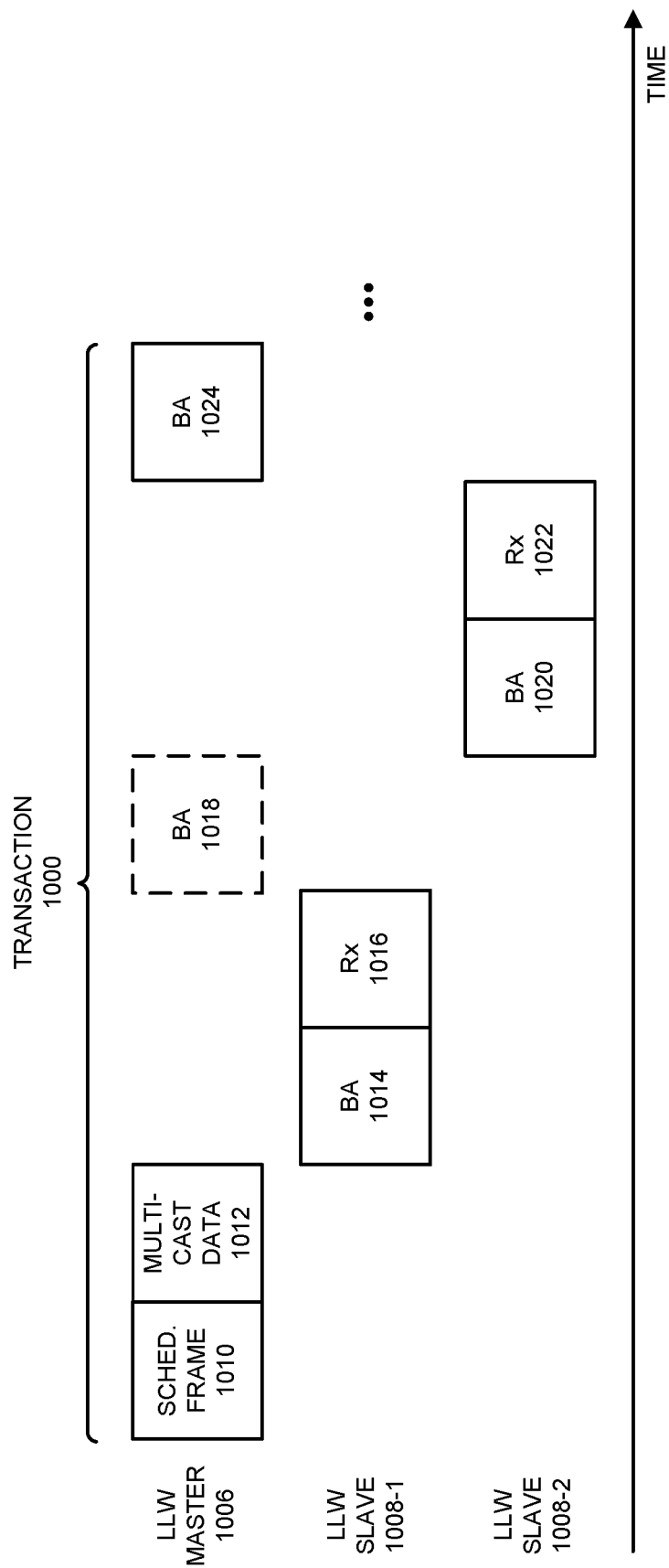

Furthermore, an LLW slave may need to retransmit one or more packets or frames from a previous transaction when an acknowledgment is not heard or received by the LLW slave and the jitter buffer can still make use of it. This is shown in FIG. 10, which presents a drawing illustrating an example of communication during a transaction 1000. Transaction 1000 may include: an optional schedule frame 1010 provided by LLW master 1006 for one or more LLW slaves 1008, multicast data 1012 provided by LLW master 1006 for one or more LLW slaves 1008, a block acknowledgment 1014 received from LLW slave 1008-1, receive data 1016 provided by LLW slave 1008-1 for LLW master 1006, a block acknowledgment 1020 received from LLW slave 1008-2, receive data 1022 provided by LLW slave 1008-2 for LLW master 1006, a block acknowledgment 1024 provided by LLW master 1006 to LLW slave 1008-2, etc.

However, LLW slave 1008-1 may not hear or receive a block acknowledgment 1018 provided by LLW master 1006 to LLW slave 1008-1 during transaction 1000 (as indicated by the dashed line around block acknowledgment 1018 in FIG. 10), and thus LLW slave 1008-1 may need to retransmit received data 1016.

The LLW master may not be able to know about this and, thus, may not take this into account in the current schedule for the transaction. Moreover, an LLW slave may not be allowed to exceed its allocated time (in order to avoid internal drift problems). If the LLW slave can add the previous packet or frame and still fit it inside the allocated time, the LLW slave may do so. However, if the LLW slave cannot fit the packet or frame in the allocated time, the LLW slave may transmit the failed packet(s) or frame(s) from the previous transaction and may turn on a 'more data bit' in a MAC header. Note that a queue size subfield may be used to indicate how many bytes are still buffered.

Additionally, packets or frames may accumulate in the LLW slaves as new packets or frames to transmit arrive. Note that the packets or frames may arrive at least at the same rate as the OTA latency (or higher). On average, the optional schedule frame may provide sufficient time for the LLW slaves to transmit all the packets or frames (because the receive data rate is known). In some embodiments, the LLW slaves may use the 'more data' and the 'queue size' subfields to provide an indication of packets or frames accumulating in their buffers.

Whenever an LLW slave transmits a frame with the 'more data' bit turned to, e.g., '1', and the 'queue size' subfield not, e.g., equal to zero, it may mean that it has buffered packets or frames to send that have not expired yet. When this occurs, the LLW master may start a transaction as soon as possible to allow the LLW slave to empty its buffered packets or frames. The LLW slave may remain listening for this transaction. Similar to the retransmission embodiments, if this transaction is pending for too long, so that it will overlap with the regularly planned period transaction, the two transactions may be merged together. Note that the LLW master may allocate sufficient time for the LLW slave based on the nominal MCS rate and the 'queue size' value reported by the LLW slave.

Moreover, during a transaction, after receiving the optional schedule frame, the LLW slaves may optionally turn off their receivers until it is their turn to transmit or received packets or frames. If a retransmission is expected, the LLW slaves may remain awake for the retransmission. Note that the LLW slaves may use the SEQNs information in the optional schedule frame to help them determine if they received all of the expected packets or frames (or not).

Furthermore, there may be power saving between transactions. For example, the objective may be to try to sleep or use a lower-power mode between LLW transmission burst in the gaps mode. In the gaps mode, the main traffic may optionally be flowing from the LLW master to the LLW slaves. However, in other embodiments with the gaps mode, this may not be the case. The power-saving technique may be based on the LLW master learning the actual transmit traffic period (as well as the variance) and estimating when the next packet or frame burst will arrive from the codec or network stack. The optional schedule frame may include the next estimated periodic transaction time (delta) and the SEQNs in the current burst. This information may allow the LLW slaves to transition to a lower-power mode until the next estimated periodic transaction. Moreover, as soon as new packets or frames arrives from the network stack, the LLW master may try to send them out as quickly as possible (the delay may depend on the shared communication channel), when the LLW slaves will be awake. If retransmission is needed (e.g., not all the LLW slaves provided acknowledgments), the LLW master may do so as soon as possible. An LLW slave that should remain on for the retransmission may do so. If an electronic device is retransmitting, it may not be allowed to add new packets or frames. The success criteria may be that no packets or frames are lost because an LLW slave is not listening, while reducing or minimizing the power consumption of the LLW slaves.

Additionally, Table 1 illustrates simulations in different receive scenarios with a constant transmit usage of 0.35%, indicate that power savings can be achieved without packets or frames being lost because a receiver is not listening. Note that the receiver may stay on longer when the traffic is delayed on the shared communication channel. Moreover, more collisions may result in more retransmissions. While the power consumption may be improved further, these simulations provide an estimate of the power savings that can be achieved.

TABLE 1

|  | Scenario 1 | Scenario 2 | Scenario 3 | Scenario 4 | Scenario 5 |
| --- | --- | --- | --- | --- | --- |
| Rx (%) | 6 | 9 | 19 | 20 | 25 |
| Tx (%) | 0.35 | 0.35 | 0.35 | 0.35 | 0.35 |
| Packet Loss | 0 | 0 | 0 | 0 | 0 |

The transmit traffic may be prioritized using dedicated queues. Notably, LLW traffic may need to have dedicated queues from the host down to the MAC layer. The LLW traffic packets or frames optionally may not be fragmented at any layer. Moreover, the transmit LLW traffic, which may use AC-VO, may get higher priority than other AC_VO traffic that is also queued up on an electronic device for the shared communication channel if the LLW slaves are expected to be currently listening. However, if there is more than one transmit LLW traffic stream registered concurrently on the electronic device, the packets or frames may be prioritized according to one or more criteria, such as: packets or frames destined for LLW slaves that are expected to be currently listening; and/or from the aforementioned packets or frames, the ones with the shortest remaining expiration time may be selected or picked.

In some embodiments, receive traffic optimization may be used. Notably, when packets or frames expire on the transmitter side, and a block acknowledgment session is being used, each transaction containing new SEQNs may move the start of its block acknowledgment window to the lowest SEQN in that transaction. This may indicate to the receiver that previous packets or frames have already expired and it may potentially allow some packets or frames that are waiting in the reorder buffer to be raised because of a gap on an expired packet or frame. Moreover, because the Wi-Fi receiver may not know if the application can still make use of the packets or frames or not, it may still send the received packets or frames to the application.

Furthermore, in some embodiments, the dedicated queues may be used to inform a LLW slave about packets or frames that have a short expiration time. For example, a LLW slave may be holding packets #2-4 for an application layer while waiting for packet #1. If packet #1 is dropped by the LLW master, the LLW slave can implicitly move a block acknowledgment window start and may provide packets #2-4 to the application layer.

Moreover, the nominal MCS rates used by the LLW master and the LLW slaves may be dictated by the LLW master in the optional schedule frame of each transaction. The nominal MCS rate may be selected to target a packet error rate (PER) of, e.g., 0.01%, as opposed to the highest throughput or the shortest transmission time. An adaptive rate adaptation technique per electronic device may be performed on the LLW master. In embodiments with multicast transmissions, the nominal MCS rate may be a lower or the lowest of the nominal MCS rates between the LLW master and LLW slaves if unicast transactions were being used.

Furthermore, for low-latency Wi-Fi traffic, it can be difficult to perform physical layer (PHY) calibrations that take up tens of milliseconds. Solutions for this problem may be implementation specific. Consequently, in some embodiments it may be helpful to assume that (at least most often) the LLW master is not using the highest MCS rates.

Additionally, if the LLW master has a pending transaction ready for transmission, and the LLW master determines that another electronic device transmits a CTS-to-self but this electronic device has not transmitted for a period of time (such as, e.g., the last 10-100 µs), the LLW master may ignore the CTS-to-self and may start the pending transaction (if there is no other reason not to start transmitting). In some embodiments, the LLW master may detect transmissions based on the physical layer header, as opposed to only using energy detection.

If there is currently a registered LLW traffic stream, the radio that is being used for the LLW traffic stream may not be allowed to perform scans on other shared communication channels. In some embodiments, there may be an exception to this rule. Notably, when the electronic device has lost its only infrastructure connection (e.g., link loss) and that infrastructure connection is required by the radio that is being used for the LLW traffic stream, the radio may perform a scan. Note that other radios may perform scans.

Moreover, LLW traffic registration may be used to set up an LLW. For example, an application programming interface (API) from the host to the MAC layer (and, more generally, an upper-layer protocol) may be used to register or update an LLW. Notably, APIs may be used to register/unregister/update the LLW traffic stream (on LLW masters and LLW slaves) may include configuration for one or more of: expiration, a maximum number of retransmissions, a contention window minimum (CWmin), a contention window maximum (CWmax), an Arbitration Inter-Frame Space Number (AIFSN) configurations, addresses of the LLW master and the LLW slaves, a multicast address to be used, a mode to be used, a traffic configuration (such as a data rate, a period, a variance, packet sizes, a number of packets in each period, etc.), an interface to be used, enable/disable a power saving mode, a radio used for the LLW, a MAC link layer protocol to be used (such as STA-AP, AWDL, NAN, etc.), an automatic receive/transmit/block-acknowledgment session setup (in which no negotiation needed), etc. Note that an LLW traffic stream may be permanently registered in some embodiments.

Furthermore, if using AWDL or NAN, the LLW master may avoid transmitting exactly at a channel switch time. Moreover, the LLW master may define statistics, notifications (such as when a peer has been lost) and/or debug capabilities.

Moreover, in some embodiments, there may be implicit acknowledgments during a transaction (as opposed to explicit acknowledgments). Furthermore, in embodiments where there is more than one LLW master on the channel (or on a radio), the LLW masters may coordinate with each other.

Note that packets or frames communicated during the communication techniques may include more or fewer bits or fields. Moreover, in some embodiments, there may be different bits of fields. Alternatively or additionally, the position of information in these packets or frames may be changed.

In some embodiments, low-latency Wi-Fi in the communication techniques is used to: communicate low-latency audio (such as a latency of, e.g., 10-30 ms), e.g., in real-time audio use cases, communicate a data stream associated with a video game, communicate 4 k video, communicate audio and/or video associated with social media, etc.

Moreover, in some embodiments of the communication techniques there may be two radios in, e.g., the LLW master that communicate the low-latency Wi-Fi concurrently. For example, a main radio may be used on an upper frequency band (such as, e.g., 5 GHz) and a dedicated radio may be used on a lower frequency band (such as, e.g., 2.4 GHz). Note that the two radios may be synchronized with each other, e.g., using in-band or out-of-band communication of synchronization information.

In summary, in the described communication techniques coordinated access and use of the shared communication channel may allow the LLW master and one or more LLW slaves to communicate efficiently (such as with low latency and higher throughput), while significantly reducing collisions associated with use of the shared communications channel. These capabilities may improve the user experience when using the LLW master and the one or more LLW slaves.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 11 presents a block diagram of an electronic device 1100 (which may be a cellular telephone, an access point, another electronic device, etc.) in accordance with some embodiments. This electronic device includes processing subsystem 1110, memory subsystem 1112, and networking subsystem 1114. Processing subsystem 1110 includes one or more devices configured to perform computational operations. For example, processing subsystem 1110 can include one or more microprocessors, one or more application-specific integrated circuits (ASICs), one or more microcontrollers, one or more programmable-logic devices, one or more graphics processing units (GPUs) and/or one or more digital signal processors (DSPs).

Memory subsystem 1112 includes one or more devices for storing data and/or instructions for processing subsystem 1110 and networking subsystem 1114. For example, memory subsystem 1112 can include dynamic random access memory (DRAM), static random access memory (SRAM), a read-only memory (ROM), flash memory, and/or other types of memory. In some embodiments, instructions for processing subsystem 1110 in memory subsystem 1112 include: one or more program modules or sets of instructions (such as program instructions 1122 or operating system 1124), which may be executed by processing subsystem 1110. For example, a ROM can store programs, utilities or processes to be executed in a non-volatile manner, and DRAM can provide volatile data storage, and may store instructions related to the operation of electronic device 1100. Note that the one or more computer programs may constitute a computer-program mechanism, a computer-readable storage medium or software. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110. In some embodiments, the one or more computer programs are distributed over a network-coupled computer system so that the one or more computer programs are stored and executed in a distributed manner.

In addition, memory subsystem 1112 can include mechanisms for controlling access to the memory. In some embodiments, memory subsystem 1112 includes a memory hierarchy that comprises one or more caches coupled to a memory in electronic device 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by electronic device 1100 as fast-access storage for often-used data, while the mass-storage device is used to store less frequently used data.

Figure 11:
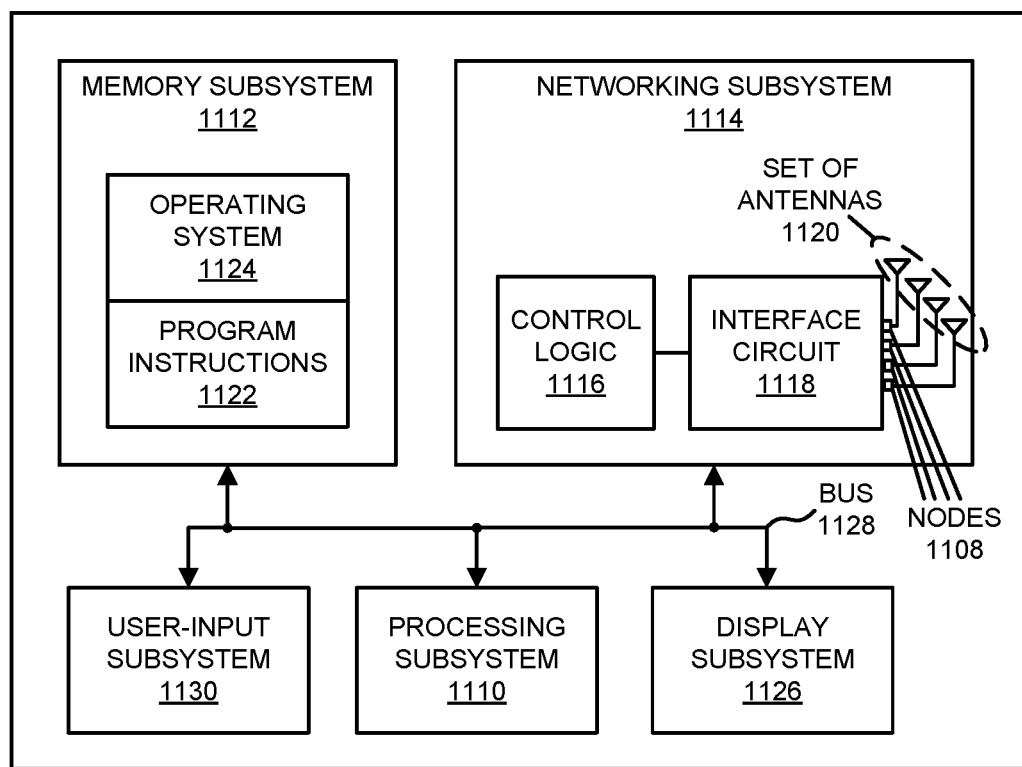
FIG. 11 is a block diagram illustrating an example of one of the electronic devices of FIG. 1.

Networking subsystem 1114 includes one or more devices configured to couple to and communicate on a wired and/or wireless network (i.e., to perform network operations), including: control logic 1116, an interface circuit 1118 and a set of antennas 1120 (or antenna elements) in an adaptive array that can be selectively turned on and/or off by control logic 1116 to create a variety of optional antenna patterns or 'beam patterns.' (While FIG. 11 includes set of antennas 1120, in some embodiments electronic device 1100 includes one or more nodes, such as nodes 1108, e.g., a pad, which can be coupled to set of antennas 1120. Thus, electronic device 1100 may or may not include set of antennas 1120.) For example, networking subsystem 1114 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 1114 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting advertising or beacon frames and/or scanning for advertising frames transmitted by other electronic devices.

Within electronic device 1100, processing subsystem 1110, memory subsystem 1112, and networking subsystem 1114 are coupled together using bus 1128 that facilitates data transfer between these components. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, electronic device 1100 includes a display subsystem 1126 for displaying information on a display, which may include a display driver and the display, such as a liquid-crystal display, a multi-touch touchscreen, etc. Display subsystem 1126 may be controlled by processing subsystem 1110 to display information to a user (e.g., information relating to incoming, outgoing, or an active communication session).

Electronic device 1100 can also include a user-input subsystem 1130 that allows a user of the electronic device 1100 to interact with electronic device 1100. For example, user-input subsystem 1130 can take a variety of forms, such as: a button, keypad, dial, touch screen, audio input interface, visual/image capture input interface, input in the form of sensor data, etc.

Electronic device 1100 can be (or can be included in) any electronic device with at least one network interface. For example, electronic device 1100 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1100, in alternative embodiments, different components and/or subsystems may be present in electronic device 1100. For example, electronic device 1100 may include one or more additional processing subsystems, memory subsystems, networking subsystems, and/or display subsystems. Additionally, one or more of the subsystems may not be present in electronic device 1100. Moreover, in some embodiments, electronic device 1100 may include one or more additional subsystems that are not shown in FIG. 11. Also, although separate subsystems are shown in FIG. 11, in some embodiments some or all of a given subsystem or component can be integrated into one or more of the other subsystems or component(s) in electronic device 1100. For example, in some embodiments program instructions 1122 is included in operating system 1124 and/or control logic 1116 is included in interface circuit 1118.

Moreover, the circuits and components in electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1114. This integrated circuit may include hardware and/or software mechanisms that are used for transmitting wireless signals from electronic device 1100 and receiving signals at electronic device 1100 from other electronic devices. Aside from the mechanisms herein described, radios are generally known in the art and hence are not described in detail. In general, networking subsystem 1114 and/or the integrated circuit can include any number of radios. Note that the radios in multiple-radio embodiments function in a similar way to the described single-radio embodiments.

In some embodiments, networking subsystem 1114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1122, operating system 1124 (such as a driver for interface circuit 1118) or in firmware in interface circuit 1118. Alternatively or additionally, at least some of the operations in the communication techniques may be implemented in a physical layer, such as hardware in interface circuit 1118. In some embodiments, the communication techniques are implemented, at least in part, in a MAC layer and/or in a physical layer in interface circuit 1118.

While examples of numerical values are provided in the preceding discussion, in other embodiments different numerical values are used. Consequently, the numerical values provided are not intended to be limiting.

While the preceding embodiments illustrated the use of Wi-Fi during the transactions, in other embodiments of the communication techniques Bluetooth Low Energy is used to communicate at least a portion of the information in a transaction. Furthermore, the information communicated in the communication techniques may be communicated in the same or a different band of frequencies that the band(s) of frequencies used by the main or primary radio. For example, the communication during a transaction may use one or more bands of frequencies, including: 900 MHz, 2.4 GHz, 5 GHz, 6 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a node configured to communicatively couple to an antenna; and
   an interface circuit, communicatively coupled to the node, configured to communicate with at least a recipient electronic device during transactions, wherein, for a transaction, the interface circuit is configured to:
   contend for access to a shared communication channel on behalf of the electronic device and the recipient electronic device, wherein the access has a duration, and wherein the shared communication channel is associated with a wireless local area network (WLAN);
   provide, to the node, a schedule frame intended for the recipient electronic device comprising information that specifies one or more time slots during the duration that are associated with the recipient electronic device and one or more communication functions of the recipient electronic device in the one or more time slots;
   provide, to the node, a data frame with data intended for the recipient electronic device; and
   receive, from the node, a response frame associated with the recipient electronic device, wherein the response frame is received during at least one of the one or more time slots;
   wherein a capacity associated with the transaction approximately equals a product of the duration and a data arrival rate in the electronic device of data intended for the recipient electronic device; and
   wherein the duration has a predefined value, a period between the transaction and a successive transaction has a second predefined value and the interface circuit is configured to contend for access to the shared communication channel on behalf of the electronic device and the recipient electronic device during the successive transaction.

2. The electronic device of claim 1, wherein the communication with the recipient electronic device is compatible with an Institute of Electrical and Electronics Engineers (IEEE) 802.11 communication protocol.

3. The electronic device of claim 1, wherein, when contending for the shared communication channel, the electronic device uses an access priority that is greater than an access priority of one or more recipient electronic devices, including the recipient electronic device.

4. The electronic device of claim 1, wherein, when there is insufficient data intended for the recipient electronic device to use all of the one or more time slots, the interface circuit is configured to provide, to the node, one or more filler frames intended for the recipient electronic device in an unused remainder of the one or more time slots.

5. The electronic device of claim 4, wherein a given filler frame comprises a null frame.

6. The electronic device of claim 1, wherein the one or more communications functions comprises transmitting data intended for the electronic device during at least some of the one or more time slots.

7. The electronic device of claim 1, wherein the electronic device comprises a buffer configured to store arriving data associated with the recipient electronic device and a size of the buffer is approximately greater than or equal to an over-the-air (OTA) latency associated with the communication between the electronic device and the recipient electronic device.

8. The electronic device of claim 1, wherein, when the transaction involves unicast communication between the electronic device and the recipient electronic device, the response frame comprises an acknowledgment.

9. The electronic device of claim 1, wherein the schedule frame is further intended for a second recipient electronic device and comprises information that specifies one or more second time slots during the duration that are associated with the second recipient electronic device and one or more communication functions of the second recipient electronic device in the one or more second time slots;
wherein the data frame with the data is further intended for the second recipient electronic device;
wherein the interface circuit is configured to receive, from the node, a second response frame associated with the second recipient electronic device; and
wherein the second response frame is received during at least one of the one or more second time slots.

10. The electronic device of claim 9, wherein the response frame comprises a block acknowledgment.

11. The electronic device of claim 1, wherein the duration is different for different transactions and the transaction ends when available data intended for the recipient electronic device is exhausted.

12. The electronic device of claim 1, wherein the interface circuit is configured to estimate a period between adjacent transactions based at least in part on arrival rate of data intended for the recipient electronic device; and
wherein the schedule frame further comprises information specifying the estimated period.

13. A non-transitory computer-readable storage medium for use in conjunction with an electronic device, the computer-readable storage medium storing program instructions that, when executed by the electronic device, cause the electronic device to perform a transaction by carrying out one or more operations comprising:
contending for access to a shared communication channel on behalf of the electronic device and a recipient electronic device, wherein the access has a duration, and wherein the shared communication channel is associated with a wireless local area network (WLAN);
providing a schedule frame intended for the recipient electronic device comprising information that specifies one or more time slots during the duration that are associated with the recipient electronic device and one or more communication functions of the recipient electronic device in the one or more time slots;
providing a data frame with data intended for the recipient electronic device; and
receiving a response frame associated with the recipient electronic device, wherein the response frame is received during at least one of the one or more time slots;
wherein a capacity associated with the transaction approximately equals a product of the duration and a data arrival rate in the electronic device of data intended for the recipient electronic device; and
wherein the duration has a predefined value, a period between the transaction and a successive transaction has a second predefined value and the operations comprise contending for access to the shared communication channel on behalf of the electronic device and the recipient electronic device during the successive transaction.

14. The non-transitory computer-readable storage medium of claim 13, wherein, when there is insufficient data intended for the recipient electronic device to use all of the one or more time slots, the one or more operations comprises providing one or more filler frames intended for the recipient electronic device in an unused remainder of the one or more time slots.

15. The non-transitory computer-readable storage medium of claim 14, wherein a given filler frame comprises a null frame.

16. A method for performing a transaction, comprising:
by an electronic device:
contending for access to a shared communication channel on behalf of the electronic device and a recipient electronic device, wherein the access has a duration, and wherein the shared communication channel is associated with a wireless local area network (WLAN);
providing a schedule frame intended for the recipient electronic device comprising information that specifies one or more time slots during the duration that are associated with the recipient electronic device and one or more communication functions of the recipient electronic device in the one or more time slots;
providing a data frame with data intended for the recipient electronic device; and
receiving a response frame associated with the recipient electronic device, wherein the response frame is received during at least one of the one or more time slots;
wherein a capacity associated with the transaction approximately equals a product of the duration and a data arrival rate in the electronic device of data intended for the recipient electronic device; and
wherein the duration has a predefined value, a period between the transaction and a successive transaction has a second predefined value and the method comprises contending for access to the shared communication channel on behalf of the electronic device and the recipient electronic device during the successive transaction.

17. The method of claim 16, wherein, when there is insufficient data intended for the recipient electronic device to use all of the one or more time slots, the method further comprises providing one or more filler frames intended for the recipient electronic device in an unused remainder of the one or more time slots.

18. The method of claim 17, wherein a given filler frame comprises a null frame.

19. The method of claim 16, wherein the schedule frame is further intended for a second recipient electronic device and comprises information that specifies one or more second time slots during the duration that are associated with the second recipient electronic device and one or more communication functions of the second recipient electronic device in the one or more second time slots;
  wherein the data frame with the data is further intended for the second recipient electronic device;
  wherein the interface circuit is configured to receive, from the node, a second response frame associated with the second recipient electronic device;
  wherein the response frame comprises a block acknowledgment; and
  wherein the second response frame is received during at least one of the one or more second time slots.

* * * * *